United States Patent
Zou et al.

(10) Patent No.: US 9,113,483 B2
(45) Date of Patent: Aug. 18, 2015

(54) METHODS AND APPARATUS OF SPECTRUM SHARING FOR CELLULAR-CONTROLLED OFFLOADING USING UNLICENSED BAND

(75) Inventors: Wei Zou, Shanghai (CN); Zhenhong Li, Shanghai (CN); Haifeng Wang, Shanghai (CN)

(73) Assignee: BROADCOM CORPORATION, Irvine, CA (US)

( * ) Notice: Subject to any disclaimer, the term of this patent is extended or adjusted under 35 U.S.C. 154(b) by 11 days.

(21) Appl. No.: 14/111,243

(22) PCT Filed: Apr. 12, 2011

(86) PCT No.: PCT/CN2011/072652
§ 371 (c)(1),
(2), (4) Date: Oct. 11, 2013

(87) PCT Pub. No.: WO2012/139278
PCT Pub. Date: Oct. 18, 2012

(65) Prior Publication Data
US 2014/0031054 A1    Jan. 30, 2014

(51) Int. Cl.
| | |
|---|---|
| H04W 72/00 | (2009.01) |
| H04W 36/00 | (2009.01) |
| H04B 17/00 | (2006.01) |
| H04B 7/00 | (2006.01) |
| H04W 72/08 | (2009.01) |
| H04W 72/12 | (2009.01) |
| H04W 16/14 | (2009.01) |

(52) U.S. Cl.
CPC ........ *H04W 72/082* (2013.01); *H04W 72/1215* (2013.01); *H04W 16/14* (2013.01)

(58) Field of Classification Search
CPC .............. H04W 16/14; H04W 72/082; H04W 72/1215; H04W 56/001; H04W 72/0453; H04W 74/0808; H04W 88/06; H04W 24/02; H04W 8/0252; H04W 28/0263; H04W 28/0289; H04W 28/08; H04W 28/16; H04W 48/10
USPC ...................... 455/418, 436, 445, 452.2, 502; 370/230.1, 329, 336, 328, 338, 342, 370/401; 709/217, 230, 249
See application file for complete search history.

(56) References Cited

U.S. PATENT DOCUMENTS

| | | |
|---|---|---|
| 2005/0122999 A1 | 6/2005 | Scherzer et al. |
| 2007/0083470 A1 | 4/2007 | Bonner et al. |
| 2008/0205261 A1 | 8/2008 | Mohebbi |
| 2012/0015607 A1* | 1/2012 | Koskela et al. ................ 455/62 |
| 2014/0036889 A1* | 2/2014 | Kim et al. ..................... 370/336 |

FOREIGN PATENT DOCUMENTS

CN        101047432        10/2007

* cited by examiner

*Primary Examiner* — Inder Mehra
(74) *Attorney, Agent, or Firm* — Oblon, McClelland, Maier & Neustadt, L.L.P.

(57) ABSTRACT

There are provided measures for spectrum sharing for cellular-controlled offloading using an unlicensed band. Such measures exemplarily comprise initiating an offloading of traffic from a cellular link on a cellular band to an unlicensed link on an unlicensed band, wherein the unlicensed link is synchronized with the cellular link, and sensing a channel on the unlicensed band in a symbol-synchronized sensing duration of at least one symbol length at the beginning of a predetermined subframe of the unlicensed band.

20 Claims, 10 Drawing Sheets

METHODS AND APPARATUS OF SPECTRUM SHARING FOR CELLULAR-CONTROLLED OFFLOADING USING UNLICENSED BAND

FIELD OF THE INVENTION

The present invention relates to methods and apparatuses of spectrum sharing for cellular-controlled offloading using an unlicensed band. More specifically, the present invention relates to methods and apparatuses of spectrum sharing to enable traffic offloading from a cellular frequency band to an unlicensed frequency band with reduced interference.

BACKGROUND

In the field of wireless communication systems, cellular systems using licensed (frequency) bands, which are typically dedicated for wide-area communications, and non-cellular systems using unlicensed (frequency) bands, which are typically dedicated for local-area communications, have been developed and are still under developments in parallel. In view thereof, an issue in this field resides in enabling a beneficial and efficient usage or cooperation of both coexisting types of wireless communication systems.

For example, aforementioned cellular systems could involve any wide-area cellular communication standard such as GSM, GPRS, UMTS, IMT-A, LTE, LTE-A, or the like, and aforementioned non-cellular (or, as referred to hereinafter, unlicensed) systems could involve any local-area communication standard such as IEEE802.11 (also referred to as Wireless Local Are Network), IEEE802.16 (also referred to as Worldwide Interoperability for Microwave Access), WiFi, or the like.

In the following, for the sake of intelligibility, LTE including LTE-Advanced (Long-Term Evolution according to 3GPP terminology) is taken as a non-limiting example for cellular systems and WiFi is taken as a non-limiting example for unlicensed systems, which are applicable in the context of the present invention and its embodiments. However, it is to be noted that any kind of wireless communication systems may likewise be applicable for any one of the cellular and unlicensed systems, as long as exhibiting comparable features and characteristics as described hereinafter.

Nowadays, unlicensed bands are widely used for wireless local-area communications, especially in the worldwide deployed WiFi systems. Because no spectrum licensing costs are involved, overall cost of a local network operating in an unlicensed band is much lower than the general cellular communication system. Moreover, although the unpredictable interference may degrade the system performance in an unlicensed band, the wide range of (at least some of) the available unlicensed bands provide the potential to avoid nearby interference and to maintain the traffic flow. As shown in Table 1 below, for example, there are 100 MHz of unlicensed bandwidth in the 2.4 GHz band and 150 MHz of unlicensed bandwidth in the 5.8 GHz band, both of which is large enough compared with 20 MHz of licensed bandwidth of general LTE systems.

Accordingly, any specified ISM band with a sufficiently large unlicensed bandwidth is generally applicable for wireless local-area communication systems which are applicable in the context of the present invention and its embodiments.

TABLE 1

| Unlicensed ISM bands | |
|---|---|
| Frequency range | Center frequency |
| 6.765-6.795 MHz | 6.780 MHz |
| 13.553-13.567 MHz | 13.560 MHz |
| 26.957-27.283 MHz | 27.120 MHz |
| 40.66-40.70 MHz | 40.68 MHz |
| 433.05-434.79 MHz | 433.92 MHz |
| 902-928 MHz | 915 MHz |
| 2.400-2.500 GHz | 2.450 GHz |
| 5.275-5.875 GHz | 5.800 GHz |
| 24-24.25 GHz | 24.125 GHz |
| 61-61.5 GHz | 61.125 GHz |
| 122-123 GHz | 122.5 GHz |
| 244-246 GHz | 245 GHz |

Given the wide range and bandwidth of available unlicensed bands, an issue resides in how to utilize them efficiently. In the context of the present invention and its embodiments, it is specifically considered hoe the unlicensed bands could be beneficially and efficiently utilized for cellular offload, especially when terminals are equipped with both a cellular (e.g. LTE) radio and an unlicensed (e.g. WiFi) radio.

A conceivable approach in this regard could be to offload traffic from a cellular (e.g. LTE) system, i.e. the licensed or cellular band, to a local or unlicensed (e.g. WiFi) system, i.e. the unlicensed or non-cellular band. In such approach, which could be referred to as WiFi offloading, a terminal needs to support WiFi MAC and PHY functions besides LTE MAC and PHY functions in order to be capable of properly communicate in both systems, i.e. bands. This would however increase the hardware and software complexity of the terminals. Also, due to the independent processing of radio signals between LTE and WiFi, the unlicensed band, i.e. the spectrum thereof, cannot be utilized in an efficient manner.

Being different from licensed bands, unlicensed bands are shared by all kinds of license-free applications. Hence, an unlicensed band generally has stricter requirements on transmission power and outband emission than a licensed band. Also, unlicensed-band communications, i.e. the terminals performing communications in unlicensed bands, must be able to tolerate any interference from other possible equipments.

Carrier sensing is typically applied in WiFi systems as the major technique to avoid unpredictable interference in the unlicensed band. In WiFi systems, the so-called CSMA/CA technique is used, and any station (including terminals and base stations, etc.) will only transmit data after the carrier channel is sensed and no signal is found in that channel. In this regard, carrier sensing in CSMA is not only used for external interference avoidance, but is also used as a multiple access mechanism. That is, when a station has found by carrier sensing that another station is transmitting traffic on a particular channel, it will postpone its transmission until the channel becomes available again. Although such a distributed sensing and access mechanism automatically makes the system robust to external interference, it requires a long random backoff delay to avoid contention between multiple access users, i.e. stations. Moreover, as mentioned above, using WiFi directly in the cellular offloading increases the hardware and software complexity at terminal side as any terminal would have to support WiFi MAC and PHY functions besides LTE MAC and PHY functions.

Hence, the aforementioned approach for offloading cellular traffic to an unlicensed band is not preferable in terms of its requirements on the terminal side and its overall performance.

In view of the above, an important issue for traffic offloading using an unlicensed band resides in how to realize interference tolerance to external environments for (cellular) terminals specifically designed and dedicated for performing communications in a licensed or cellular system (band). Another an important issue for traffic offloading using an unlicensed band resides in how interference can be reduced, or at least excessive interference can be avoided, in view of both the unlicensed nature of (and, thus, quasi unrestricted access to) the band used for traffic offloading and the mobility of terminals in the context of wireless communications.

Conventionally, there are no solutions to overcome such problems for traffic offloading using an unlicensed band in an efficient manner.

In view thereof, there do not exist any mechanisms or techniques of spectrum sharing for traffic offloading using an unlicensed band. More specifically, there do not exist any mechanisms or techniques of spectrum sharing to enable traffic offloading from a cellular frequency band to an unlicensed frequency band with reduced interference.

Thus, there is still a need to further improve such systems in terms of proper spectrum sharing measures in this regard.

SUMMARY

Various exemplary embodiments of the present invention aim at addressing at least part of the above issues, problems and drawbacks.

Various aspects of exemplary embodiments of the present invention are set out in the appended claims.

According to an exemplary first aspect of the present invention, there is provided a method comprising initiating an offloading of traffic from a cellular link on a cellular band to an unlicensed link on an unlicensed band, wherein the unlicensed link is synchronized with the cellular link, and sensing a channel on the unlicensed band in a symbol-synchronized sensing duration of at least one symbol length at the beginning of a predetermined subframe of the unlicensed band.

According to an exemplary second aspect of the present invention, there is provided a method comprising configuring, at or by a cellular base station, an offloading of traffic from a cellular link on a cellular band to an unlicensed link on an unlicensed band, wherein the unlicensed link is synchronized with the cellular link, said configuring being applicable for a cluster of paired terminals residing in a cell being controlled by the cellular base station, and sending a configured parameter of traffic offloading to a terminal serving as a master of the cluster.

According to an exemplary third aspect of the present invention, there is provided an apparatus comprising an interface configured for communication on a cellular band and an unlicensed band, and a processor configured to initiate an offloading of traffic from a cellular link on a cellular band to an unlicensed link on an unlicensed band, wherein the unlicensed link is synchronized with the cellular link, and sense a channel on the unlicensed band in a symbol-synchronized sensing duration of at least one symbol length at the beginning of a predetermined subframe of the unlicensed band.

According to an exemplary fourth aspect of the present invention, there is provided an apparatus comprising an interface configured for communication on a cellular band, and a processor configured to configure an offloading of traffic from a cellular link on the cellular band to an unlicensed link on an unlicensed band, wherein the unlicensed link is synchronized with the cellular link, said configuring being applicable for a cluster of paired terminals residing in a cell being controlled by a cellular base station, send, via the interface, a configured parameter of traffic offloading to a terminal serving as a master of the cluster, wherein the apparatus is operable as or at the cellular base station.

According to an exemplary fifth aspect of the present invention, there is provided a computer program product comprising computer-executable components which, when the program is run on a computer, are configured to execute the method according to any one of the first and second aspects.

Further developments or modifications of any one of the above-mentioned aspects are evident from the following description of exemplary embodiments of the present invention.

By way of exemplary embodiments of the present invention, there are provided mechanisms or techniques of spectrum sharing for traffic offloading using an unlicensed band. More specifically, by way of exemplary embodiments of the present invention, there are provided mechanisms or techniques of spectrum sharing to enable traffic offloading from a cellular frequency band to an unlicensed frequency band with reduced interference.

Thus, improvement is achieved by methods, apparatuses (also referred to as devices) and computer program products enabling spectrum sharing for cellular-controlled traffic offloading using an unlicensed band.

BRIEF DESCRIPTION OF DRAWINGS

For a more complete understanding of exemplary embodiments of the present invention, reference is now made to the following description taken in connection with the accompanying drawings in which.

DESCRIPTION OF EXEMPLARY EMBODIMENTS

Figure 1:
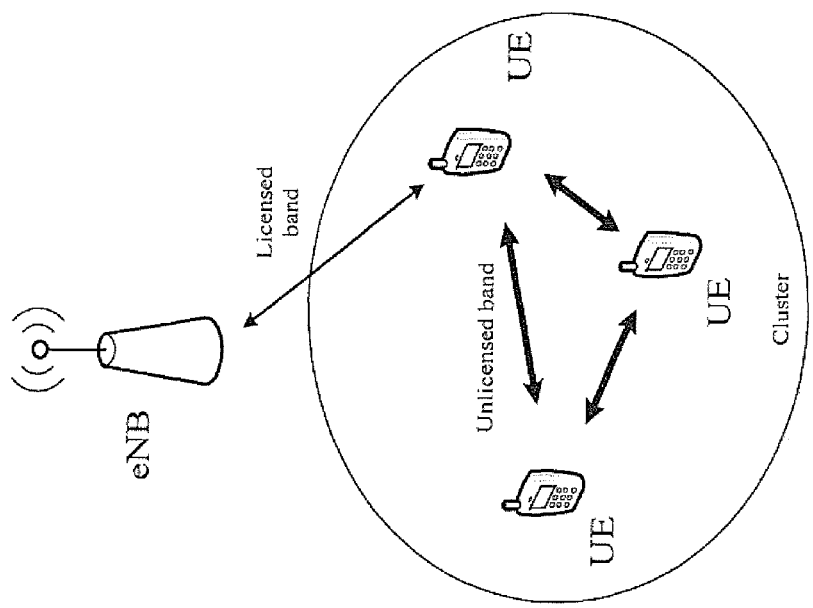
FIG. 1 shows a schematic diagram of an exemplary network scenario of a cellular-controlled offloading using an unlicensed band, for which exemplary embodiments of the present invention are applicable.

Exemplary aspects of the present invention will be described herein below. More specifically, exemplary aspects of the present are is described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following exemplary description mainly refers to specifications being used as non-limiting examples for certain exemplary network configurations and deployments. In particular, LTE (including LTE-Advanced) and WiFi are used as non-limiting examples for the applicability of thus described exemplary aspects and embodiments. As such, the description of exemplary aspects and embodiments given herein specifically refers to terminology which is directly related thereto. Such terminology is only used in the context of the presented non-limiting examples, and does naturally not limit the invention in any way. Rather, any other communication systems, bands, network configurations or system deployments, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for cellular-controlled traffic offloading using an unlicensed band.

Exemplary embodiments of the present description, as described herein, are based on an approach for offload traffic from a cellular (e.g. LTE, LTE-A) system, i.e. the licensed or cellular band, to a local or unlicensed (e.g. WiFi) system, i.e. the unlicensed or non-cellular band, which is referred to as cellular-controlled unlicensed offloading or cellular-controlled offloading using unlicensed band. Herein, the cellular band may be a frequency band of any wide-area cellular communication standard such as LTE, LTE-A, or the like, and the unlicensed band may be a frequency band of any local-area communication standard such as WiFi, or the like.

When cellular-controlled unlicensed offloading is applied, two or several terminals need to switch from a cellular band to an unlicensed band and transmit their traffic at that band under the control of a base station. In this case, the interference avoidance to unpredictable interference in that unlicensed band is to be specifically considered. This is because current cellular communication protocols (such as LTE) are originally designed for usage in a licensed (cellular) band, which is why their interference avoidance capability is typically very limited, especially to unpredictable external interference prevailing in unlicensed bands.

FIG. 1 shows a schematic diagram of an exemplary network scenario of a cellular-controlled offloading using an unlicensed band, for which exemplary embodiments of the present invention are applicable.

As shown in FIG. 1, several terminals (UE) are paired by a single base station (eNB) to form a cluster such that the terminals can communicate with each other directly using an unlicensed band under the help of the base station (eNB) control. While the paired terminals communicate with each other through an unlicensed band, they typically keep their cellular links to the base station (eNB) in the licensed cellular band simultaneously.

As indicated in FIG. 1, at least one licensed cellular link is required between a terminal of a cluster (for example, the master terminal thereof) and the base station so as to enable cellular-controlled unlicensed offloading. The approach of cellular-controlled unlicensed offloading has the advantage that the terminals only need to support LTE MAC and PHY functions.

A cellular-controlled unlicensed offloading function according to exemplary embodiments of the present invention is especially helpful in busy hours when the cellular network load is heavy. Also, as there is no license fee for an unlicensed band, this offloading scenario also provides a technique for operators to save spectrum-licensing cost. In the extreme case, an operator can even lease a very narrow LTE band for the necessary LTE control signaling and put all the established traffic links to the unlicensed band.

For the subsequent exemplary description, it is assumed that each terminal in cellular-controlled unlicensed offloading has two types of radio, namely a cellular radio, such as LTE, and an unlicensed radio, such as WiFi. Further, it is assumed that each terminal has (at least) two simultaneous radio links, namely cellular (e.g. LTE) link in the licensed band and a local (e.g. WiFi) link in the unlicensed band.

In general terms, according to exemplary embodiments of the present invention, the following basic concepts are proposed, which are equally applicable in a separate and a combined manner, respectively.

In this report, a novel implementation of sensing mechanism is firstly discussed for LTE unlicensed offloading. Then some solutions are proposed to avoid mutual interference between offloading clusters. In this IR we want to claim:

(1) Introduction of a spectrum sensing technique for avoiding or at least reducing interference in an offloading cluster. In this technique, a symbol-synchronized sensing duration is introduced at the beginning of an offloading transmission so that the unlicensed offloading (unlicensed) link with sensing capability can utilize the synchronization of the offloaded (cellular) link while avoiding unpredictable interference.

(2) Introduction of an interference avoidance technique for avoiding or at least reducing mutual interference between offloading clusters. In this technique, a dummy signal transmission after a random or a fixed (and base station controlled) delay and a band sharing control or configuration is introduced.

With reference to FIGS. 2 to 6, aforementioned concept (1) is described hereinafter in greater detail. As indicated above, it is noted that any details of concept (1) are combinable in with any details of concept (2) described below.

Figure 2:
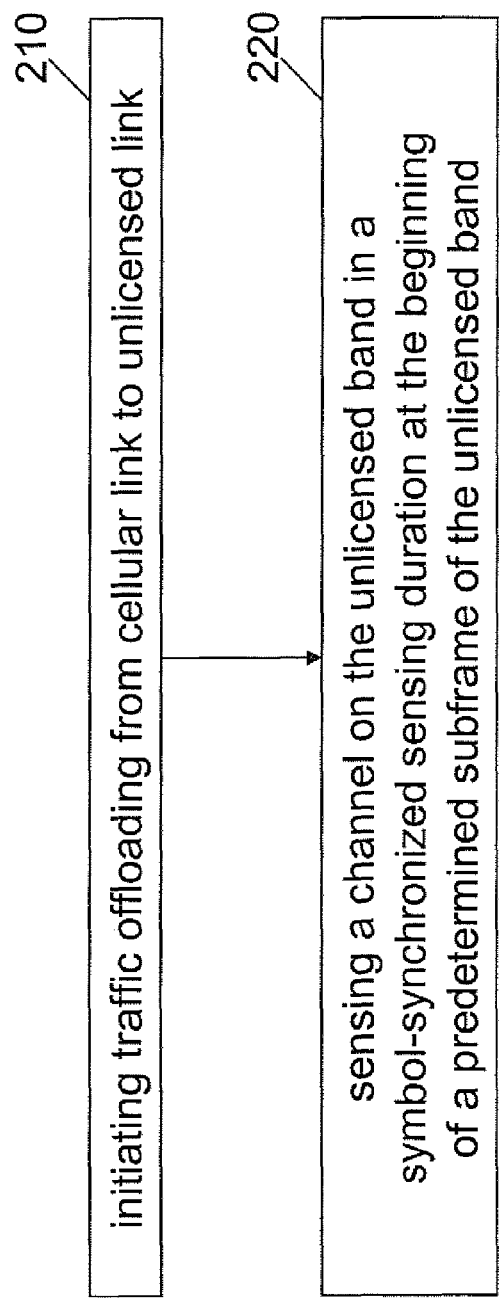
FIG. 2 shows a flowchart illustrating an exemplary procedure which is operable at or by a terminal according to exemplary embodiments of the present invention.

FIG. 2 shows a flowchart illustrating an exemplary procedure which is operable at or by a terminal according to exemplary embodiments of the present invention.

As shown in FIG. 2, a method according to exemplary embodiments of the present invention, may comprise initiating an offloading of traffic from a cellular link on a cellular band to an unlicensed link on an unlicensed band, wherein the unlicensed link is synchronized with the cellular link (for example, on the basis of at least one of a subframe and a symbol)(210), and sensing a channel on the unlicensed band in a symbol-synchronized sensing duration of at least one symbol length at the beginning of a predetermined subframe of the unlicensed band (220).

According to exemplary embodiments of the present invention, such method is equally applicable at master and slave terminals of clusters of paired terminals residing in a cell being controlled by a cellular base station, i.e. so-called offloading clusters. Details thereof are detailed below.

Figure 3:
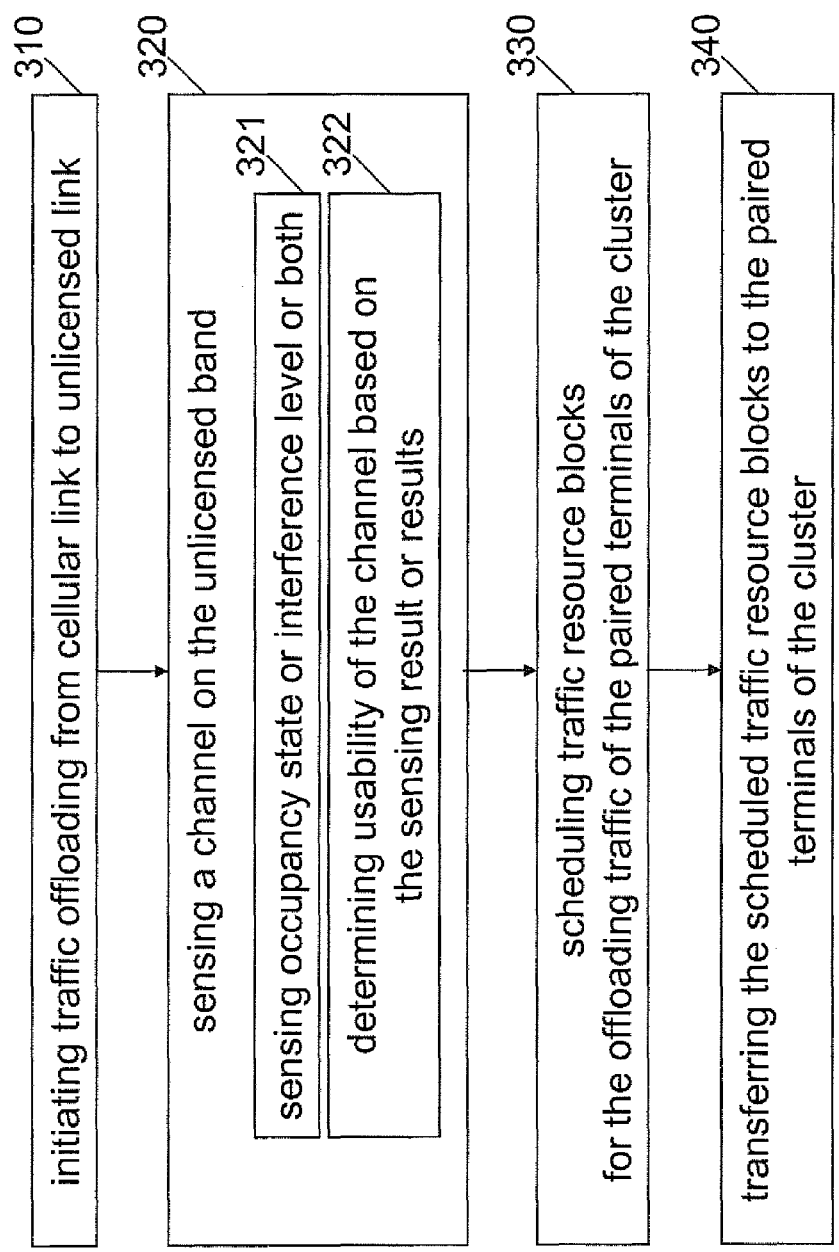
FIG. 3 shows a flowchart illustrating an exemplary procedure which is operable at or by a master terminal according to exemplary embodiments of the present invention.

FIG. 3 shows a flowchart illustrating an exemplary procedure which is operable at or by a master terminal according to exemplary embodiments of the present invention.

According to exemplary embodiments of the present invention, when spectrum sensing is performed at a master terminal of an offloading cluster, the symbol-synchronized sensing duration is located at the beginning of a beacon subframe of the unlicensed band.

As shown in FIG. 3, according to exemplary embodiments of the present invention, the sensing (320) may comprise sensing at least one of an occupancy state (i.e. whether or not the sensed channel is idle) and an interference level of the channel (i.e. how large an interference level on the sensed channel is) in the sensing duration on the unlicensed band (321), and determining (322) whether or not the channel on the unlicensed band is usable for the initiated traffic offloading on the basis of the at least one of the sensed occupancy state and the sensed interference level of the sensed channel. In this regard, the channel may be determined to be usable for the initiated traffic offloading when at least one of the following conditions applies, namely that the occupancy state is sensed to be idle (i.e. no other station is currently using the sensed channel) and that the interference level is sensed to be below a predetermined threshold level (i.e. there is not above a predetermined threshold level defining an excessive external interference on the sensed channel).

As shown in FIG. 3, according to exemplary embodiments of the present invention, the method may further comprise scheduling (330), when the channel of the unlicensed band is usable for the initiated traffic offloading, traffic resource blocks on the unlicensed band (i.e. a block of a particular time interval or subframe on a particular bandwidth of frequency within the unlicensed band) for the offloading traffic of the paired terminals of the cluster, and transferring (340) the scheduled traffic resource blocks to the paired terminals of the cluster on the unlicensed band. Herein, a traffic resource block may be dedicated for at least one of transmitting and receiving operations of a certain terminal.

Figure 4:
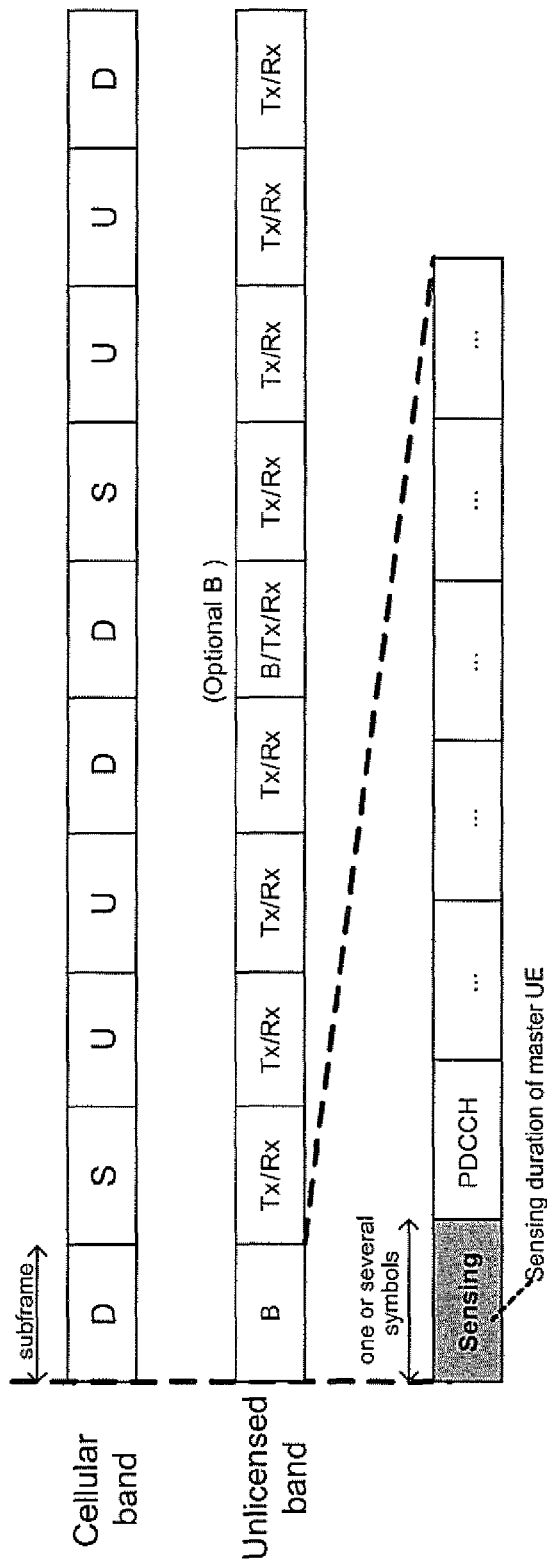
FIG. 4 shows a schematic diagram of an exemplary frame structure usable in operations at or by a master terminal according to exemplary embodiments of the present invention.

FIG. 4 shows a schematic diagram of an exemplary frame structure usable in/for operations at or by a master terminal according to exemplary embodiments of the present invention. In FIG. 4, the cellular band comprises (D) subframes for downlink transmission, (U) subframes for uplink transmission, and special (S) subframes for downlink-to-uplink switching, and the unlicensed band comprises beacon (B) subframes for beacon signal transmission and traffic (Tx/Rx) subframes for at least one of transmitting and receiving operations.

As is shown in FIG. 4, the first subframe in the unlicensed band, which represents the beginning of an offloading transmission, is a beacon subframe. Optionally, beacon subframes may be repeated in a period manner (for example, the sixth subframe in the unlicensed band may also be a beacon subframe), which is effective for reducing the round-trip delay in the unlicensed offloading.

According to exemplary embodiments of the present invention, the first symbol (or the first plurality of symbols) in the beacon subframe is utilized for sensing purposes. The number of symbols to be utilized for sensing purposed may be pre-configured or controlled by the base station of the relevant offloading cluster. By way of spectrum or channel sensing in the first symbol or symbols in the beacon subframe, the master terminal of the cluster of paired terminals can find out, if it is possible to use the unlicensed band (channel) in this frame.

If the sensing result is affirmative, i.e. the unlicensed channel is not occupied (i.e. idle) and exhibits an acceptable interference, it can be used in LTE offloading, and the master will schedule the transmission and receiving of the paired terminals. The thus resulting schedule for the paired terminals is transferred so as to inform the paired terminals accordingly. This could be accomplished by transmitting scheduling information, such as PDCCH scheduling information, in the one or more symbols in the beacon subframe, which follow the sensing duration. Upon receiving the scheduling information, such as PDCCH scheduling information, the paired (slave) terminals of the offloading cluster can perform either transmission or receiving accordingly in the following Tx/Rx subframe or subframes as scheduled (see below for details).

If the sensing result is negative, i.e. the unlicensed channel is occupied (i.e. not idle) or exhibits an excessive interference, it cannot be used in LTE offloading, and the master will neither perform scheduling nor transmit any scheduling information By way of the method as described in connection with FIGS. 3 and 4, unpredictable interference in the unlicensed band can be avoided effectively at the master terminal side.

In view of the above-described method, it is noted to be assumed (for the sake of simplicity of explanation only) that there is only one offloading cluster in a cellular (e.g. LTE) cell, i.e. controlled by a single base station (eNB). Due to this assumption, only external interference within the single offloading cluster is relevant, and no mutual interference between multiple offloading clusters is to be considered. Yet, when the same cellular (e.g. LTE) cell, i.e. the same base station (eNB) has multiple offloading clusters, a contention may happen between nearby offloading clusters as they start to send PDCCH) scheduling information simultaneously after the same sensing period. While this can lead to problems in terms of mutual interference and band sharing, such problems can be solved by aforementioned concept (2) as described below, namely by at least one of a dummy signal transmission after a random or a fixed delay and a band sharing control/configuration.

Figure 5:
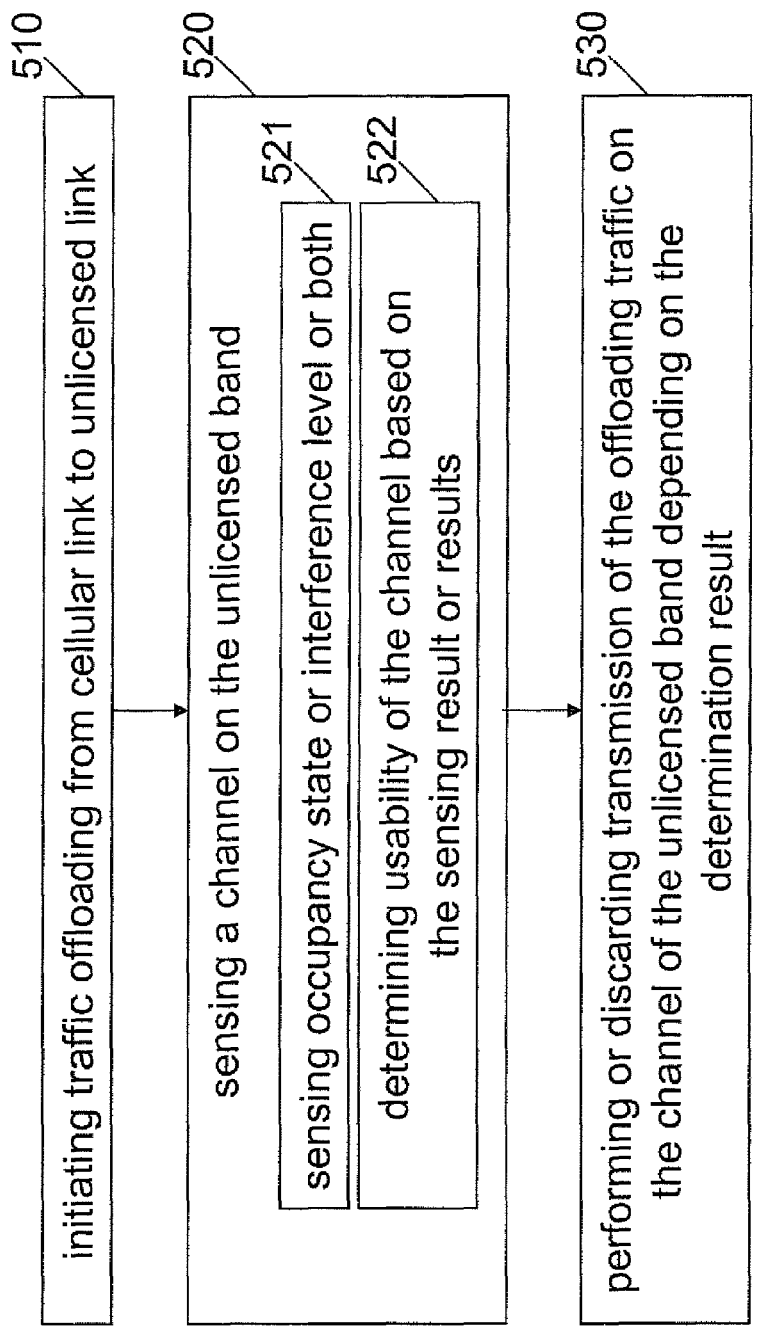
FIG. 5 shows a flowchart illustrating an exemplary procedure which is operable at or by a slave terminal according to exemplary embodiments of the present invention.

FIG. 5 shows a flowchart illustrating an exemplary procedure which is operable at or by a slave terminal according to exemplary embodiments of the present invention.

According to exemplary embodiments of the present invention, when spectrum sensing is performed at a slave terminal of an offloading cluster, the symbol-synchronized sensing duration is located at the beginning of a traffic resource block including a transmission subframe (period) on a scheduled transmission bandwidth (frequency) of the terminal. Such scheduled transmission subframe (period) and bandwidth (frequency) represent a scheduled transmission resource block as scheduled by and received from the master terminal of the offloading cluster.

As shown in FIG. 5, according to exemplary embodiments of the present invention, the sensing (520) may comprise sensing at least one of an occupancy state (i.e. whether or not the sensed channel is idle) and an interference level of the channel (i.e. how large an interference level on the sensed channel is) in the sensing duration on the unlicensed band (521), and determining (522) whether or not the channel on the unlicensed band is usable for the initiated traffic offloading on the basis of the at least one of the sensed occupancy state and the sensed interference level of the sensed channel. In this regard, the channel may be determined to be usable for the initiated traffic offloading when at least one of the following conditions applies, namely that the occupancy state is sensed to be idle (i.e. no other station is currently using the sensed channel) and that the interference level is sensed to be below a predetermined threshold level (i.e. there is not above a predetermined threshold level defining an excessive external interference on the sensed channel).

As shown in FIG. 5, according to exemplary embodiments of the present invention, the method may further comprise performing transmission of the offloading traffic on the channel of the unlicensed band, when the channel of the unlicensed band is usable for the initiated traffic offloading, or discarding transmission of the offloading traffic on the channel of the unlicensed band, when the channel of the unlicensed band is not usable for the initiated traffic offloading (530).

Figure 6:
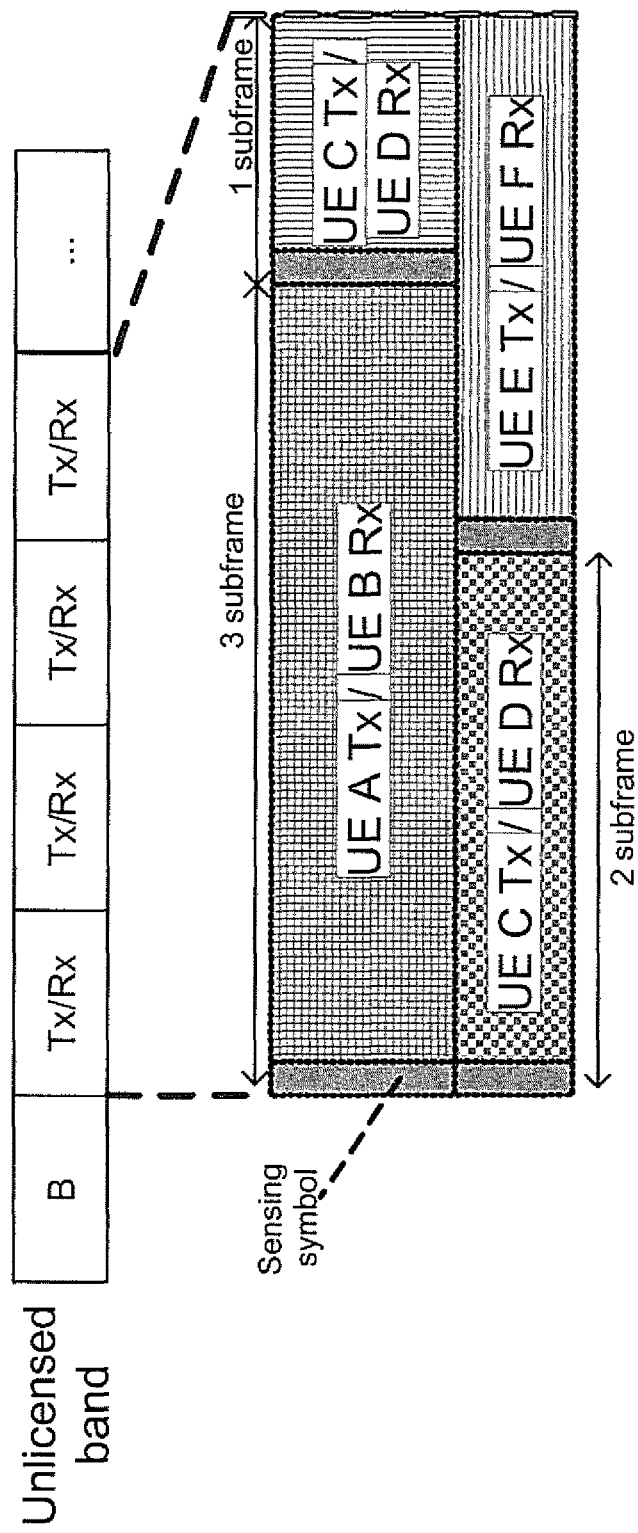
FIG. 6 shows a schematic diagram of an exemplary frame structure usable in operations at or by a slave terminal according to exemplary embodiments of the present invention.

FIG. 6 shows a schematic diagram of an exemplary frame structure usable in or for operations at or by a slave terminal according to exemplary embodiments of the present invention. In FIG. 6, the unlicensed band comprises a beacon (B) subframe and traffic (Tx/Rx) subframes.

As is shown in FIG. 6, the first subframe in the unlicensed band, which represents the beginning of an offloading transmission, is a Tx/Rx subframe in a bandwidth (frequency) scheduled for the relevant terminal in question. For example, according to the exemplary illustration of FIG. 6, the first Tx subframe of UE A in the upper bandwidth part is represented by the block filled with a squared hatching, the first Tx subframe of UE C in the upper bandwidth part is represented by the block filled with a vertical hatching, the Tx first subframe of UE C in the lower bandwidth part is represented by the block filled with a checkered hatching, and the Tx first subframe of UE E in the lower bandwidth part is represented by the block filled with a horizontal hatching.

Normally, after a slave terminal receives (PDCCH) scheduling information in the unlicensed band (from the master terminal), it will perform the corresponding transmission or receiving actions according to the scheduling information (in the PDCCH). According to exemplary embodiments of the present invention, to avoid unpredictable interference, the first one or several symbols in the scheduled resource block for traffic transmission is used to sensing the environment.

According to exemplary embodiments of the present invention, the first symbol (or the first plurality of symbols) in the respective first Tx subframe is utilized for sensing purposes. The number of symbols to be utilized for sensing purposed may be pre-configured or controlled by the base station of the relevant offloading cluster. By way of spectrum or channel sensing in the first symbol or symbols in the respective first Tx subframe, the respective slave terminal can find out, if it is possible to use the unlicensed band (channel) in this frame. As described above, the individual sensing is only performed in the scheduled frequency bandwidth, although the time is always the first symbol in each transmission schedule. In this way, the unpredictable interference at a slave terminal side can be effectively avoided.

While in the example of FIG. 6 the scheduled transmissions of slave terminals start from the first subframe after the beacon subframe, this can also be different, e.g. be changed according to the master terminal's scheduling (in PDCCH).

If the sensing result is affirmative, i.e. the unlicensed channel is not occupied (i.e. idle) and exhibits an acceptable interference, it can be used in LTE offloading, and the slave will perform the offloading transmission. If the sensing result is negative, i.e. the unlicensed channel is occupied (i.e. not idle) or exhibits an excessive interference, it cannot be used in LTE offloading, and the slave will not perform but discard or stop the offloading transmission (and wait for the subsequent scheduled Tx subframe).

In the case that a paired slave terminal does not decode the scheduling information (e.g. the PDCCH on which the scheduling information is transmitted) correctly e.g. due to nearby interference, the scheduled terminal will not transmit anything. Because the PDCCH generally uses a more robust coding and modulation method, the slave terminals may usually receive the PDCCH and the thus transmitted scheduling information correctly if the interference is not too large.

By way of the method as described in connection with FIGS. 5 and 6, unpredictable interference in the unlicensed band can be avoided effectively at the slave terminal side.

According to exemplary embodiments of the present invention, although only the first symbol can be used for sensing purpose at at least one of the master side and the slave side, the number of utilized symbols may be configurable. For example, two or more symbols can be used for sensing purpose in the offloading clusters. In this case, the sensing duration can be notified e.g. at the offloading-cluster setup stage e.g. by LTE RRC signaling. According to exemplary embodiments of the present invention, the base station can define two types of sensing duration values, namely e.g. one sensing duration value for master terminals in different offloading clusters (in this case, a random or notified delay according to concept (2) described below should be considered, if applied), and the other for other slave offloading terminals.

The advantages of such a spectrum sensing technique as described herein include for example that (1) cellular (e.g. LTE) synchronization can be fully utilized in the unlicensed (local) link and there is no need to send any preamble or the like before each data-burst transmission (like in WiFi systems); (2) the unlicensed band can still be scheduled in the same manner as in the cellular (e.g. LTE) system and all the cellular (e.g. LTE) MAC and PHY functionality can be reused in the local unlicensed band; and (3) unpredictable interference can be avoided efficiently and the offloading terminal will not waste energy (due to senseless transmissions) when interference comes.

Figure 7:
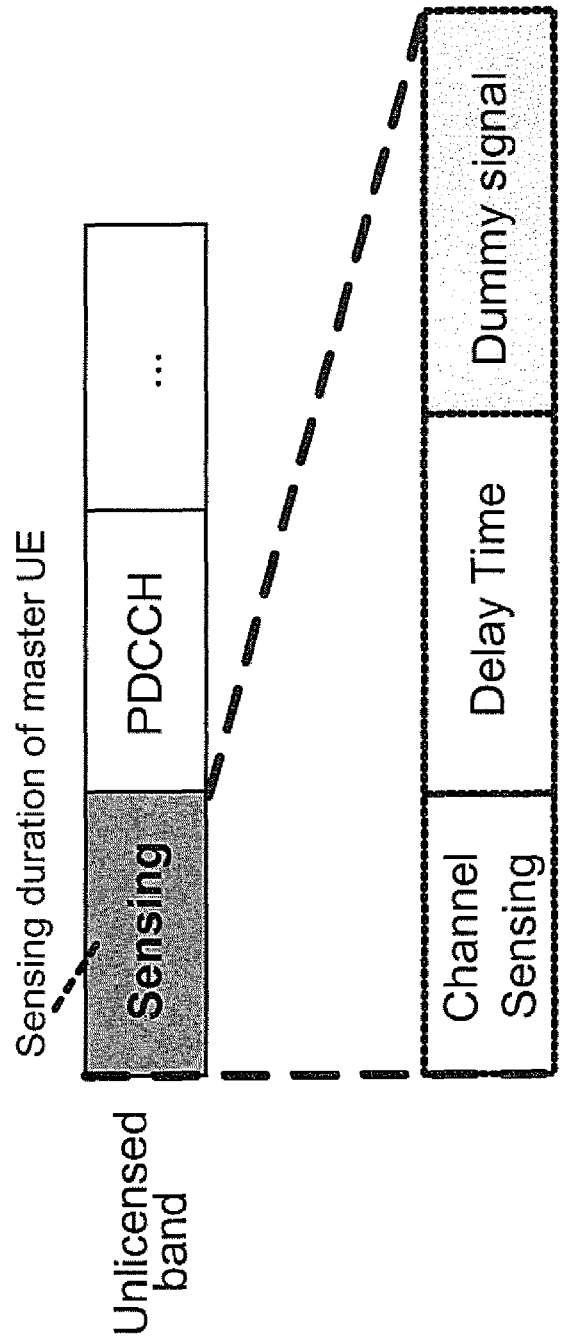
FIG. 7 shows a schematic diagram of an exemplary frame structure usable in operations at or by a master terminal according to exemplary embodiments of the present invention.
Figure 8:
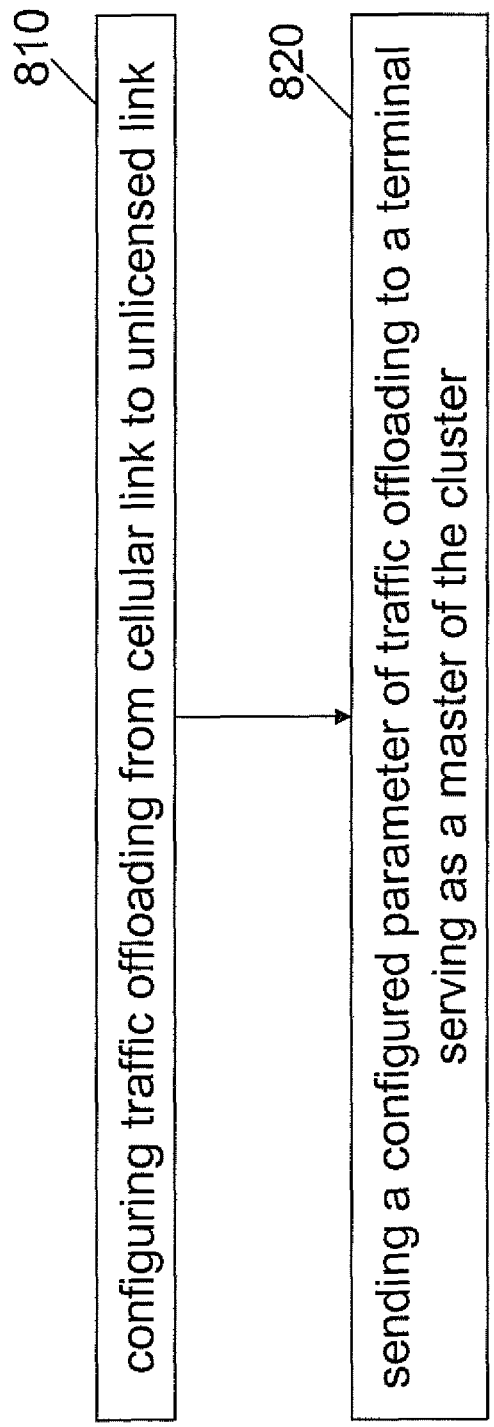
FIG. 8 shows a flowchart illustrating an exemplary procedure which is operable at or by a base station according to exemplary embodiments of the present invention.
Figure 9:
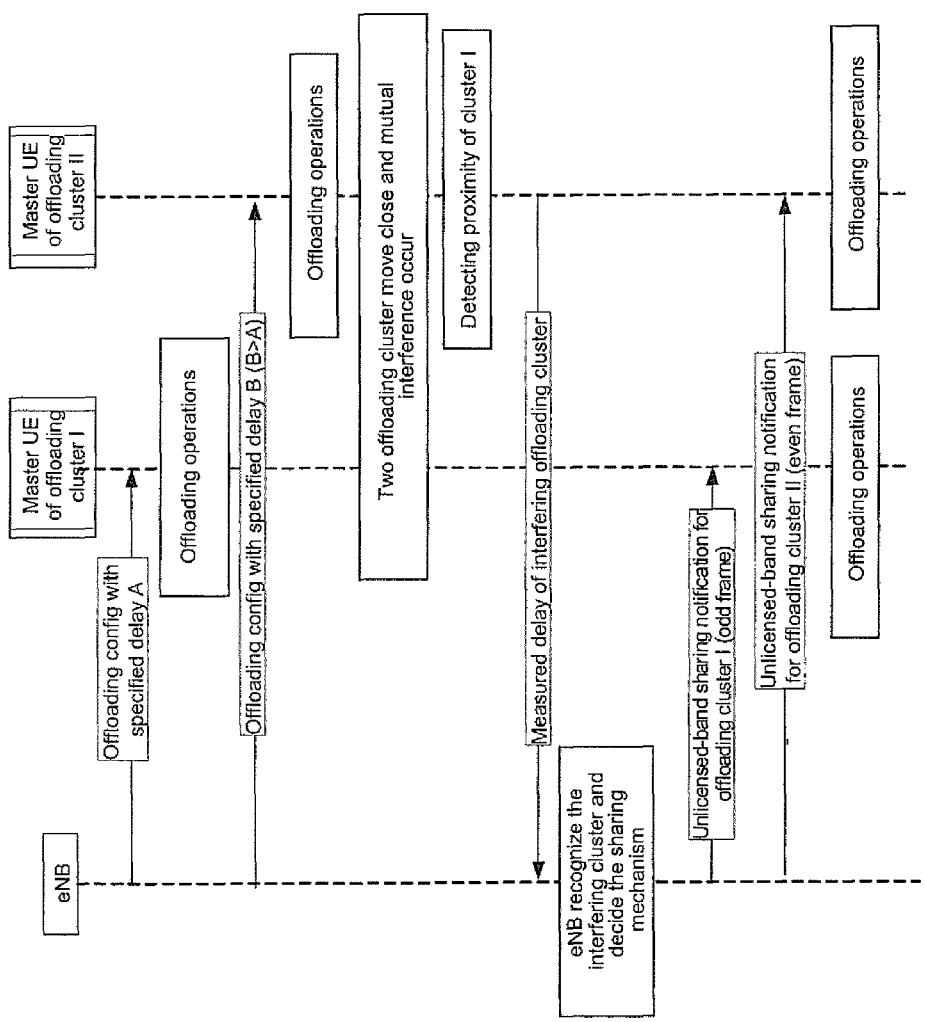
FIG. 9 shows a signaling diagram illustrating an exemplary procedure according to exemplary embodiments of the present invention.

With reference to FIGS. 7 to 9, aforementioned concept (2) is described hereinafter in greater detail. As indicated above, it is noted that any details of concept (2) are combinable in with any details of concept (1) described above.

Although the above-described spectrum sensing technique can effectively detect external interference from the environment within a single offloading cluster, it can not avoid a contention between multiple offloading clusters in the same cell in an efficient manner. This is because the master terminals of the individual offloading clusters would, according to the above-described spectrum sensing technique, always perform the sensing and start to transmit the scheduling information simultaneously, and there is no chance for them to find each other and, thus, to avoid the mutual interference between the multiple offloading clusters.

FIG. 7 shows a schematic diagram of an exemplary frame structure usable in or for operations at or by a master terminal according to exemplary embodiments of the present invention.

In a method according to exemplary embodiments of the present invention, a sensing (e.g. 220 in FIG. 2 or 320 in FIG. 3) at a master terminal of an offloading cluster may comprises (when the channel of the unlicensed band is usable for the initiated traffic offloading) transmitting a dummy signal for occupying the sensed channel within the predetermined subframe (e.g. the beacon subframe) after elapse of a predetermined delay time since the sensing of the channel is completed. The predetermined delay time may be random or fixedly preconfigured by the cellular base station.

According to exemplary embodiments of the present invention, the dummy transmission may be performed after a random delay time. This random delay time may be preconfigured or dynamically notified by the base station controlling the cluster of the respective master terminal.

In this case, the master terminal starts its dummy signal transmission after a randomized delay once the channel is found idle during the beacon subframe. The offloading master terminal should, as described above, perform sensing at the beginning of beacon subframe. If the interference is too large (e.g. due to another nearby offloading cluster), the master terminal will stop its action and wait for the next beacon subframe to try again. If the interference is small enough, the master terminal may monitor the channel for a randomized period. Then, if the channel is still workable after this delay time, the master terminal starts to transmit some dummy signal in the remaining sensing duration, i.e. until the end of the beacon subframe. For example, the dummy signal can be an all-"1" sequence in the temporal domain. As, in the example case of LTE, one LTE symbol generally has about 100 µs length and a sensing action may take about 4 µs, such kind of avoidance solution can generally work. Accordingly, the random delay time may range between about 0 and 96 µs.

Because different offloading clusters randomly choose different delay values, the cluster that chooses the minimal delay value will start its dummy signal transmission, thus occupying the sensed channel for its own use. Once a dummy signal is transmitted, the master terminals of the other offloading clusters nearby will detect it and abandon their transmissions, as a too large interference is found.

According to exemplary embodiments of the present invention, the dummy transmission may be performed after a fixedly configured delay time. Such fixed delay time may be configured or dynamically notified by the base station controlling the cluster of the respective master terminal. Accordingly, such embodiments are (further) based on a base station (eNB) coordination in terms of configuration or control.

Although most contentions between different offloading clusters in a same (e.g. LTE) cell can be avoided by the above-described embodiments in which a random delay time is used, some contentions may still occur (although in low probability) when two nearby offloading clusters choose a same (or very similar) random delay time. Such kind of residual contentions may still occur in the offloading clusters due to the following two reasons:

(a) The scope of a random time value may not be large enough in the short sensing duration of an offloading master terminal so that a number of nearby offloading clusters are able to differentiate their transmission timing sufficiently for avoiding mutual interference.

(b) The signaling information in the following control channel (such as e.g. the PDCCH) is very important because it contain the scheduling information of the whole offloading cluster, which is why a proper transmission thereof is to be ensured.

In order to cancel such kind of residual contentions, exemplary embodiments of the present invention propose that a base station (eNB) allocates a different delay time to each offloading cluster. By virtue of such base station configuration or control, contention between the master terminals in different offloading clusters can be completely avoided. In this case, the delay time is not a random delay any more, but a specified delay controlled by the base station controlling the respective offloading clusters.

To implement such exemplary embodiments of the present invention, the specified delay time may be notified from the base station to the master terminal of any relevant offloading cluster (i.e. the nearby clusters causing mutual interference) by a (LTE) RRC signaling message. Once a master terminal receives such notification from its controlling base station, it may start to transmit a dummy signal (such as e.g. an all-"1" temporal sequence) after the notified delay time, if the channel is always workable meanwhile. Because the base station will specify different delay times for different offloading clusters in its cell, the master terminals can easily find each other by channel sensing when they move close to each other (due to the different dummy signal transmission timings).

According to exemplary embodiments of the present invention, a band sharing mechanism on the basis of a parameter other than the above-described delayed dummy signal transmission may be applied additionally or alternatively.

Such band sharing mechanism according to exemplary embodiments of the present invention can be effective for resolving at least one of interference and channel occupancy problems between nearby offloading clusters, which may not e completely prevented by way of the above-described delayed dummy signal transmission.

Namely, if the base station specifies a different delay time for each offloading cluster in its cell, some offloading cluster with a smaller delay time can occupy the unlicensed band exclusively. To resolve this problem, a feedback mechanism (between master terminal or terminals and base station) is proposed to be applied (possibly in addition to the above-described delayed dummy signal transmission) after an offloading cluster finds some other offloading cluster moving nearby. That is, if an offloading cluster finds that the sensed channel is occupied by others during a random or fixedly configured delay time, it can report a measure channel idle time to its base station. Based on this report, the base station can know which (e.g. two) offloading clusters are near to each other and cause at least one of mutual interference and channel occupancy problems. Then, the base station can decide on a band or spectrum sharing mechanism to be applied for resolving these problems between the involved offloading clusters, and apply the thus decided band or spectrum sharing mechanism to the involved offloading clusters. For example, one of the offloading clusters can be notified to use only odd (sub-)frames in the unlicensed band, and the other offloading clusters can be notified to use only even (sub-)frames in the unlicensed band. In addition or as alternative to the assignment of odd or even (sub-)frames to be used by specific offloading clusters, any conceivable parameter applicable for channel or band or spectrum sharing may be equally used.

FIG. 8 shows a flowchart illustrating an exemplary procedure which is operable at or by a base station according to exemplary embodiments of the present invention.

As shown in FIG. 8, a method according to exemplary embodiments of the present invention, which is operable at or by a base station of a cluster of paired terminals residing in a cell being controlled by this base station, may comprise configuring (810) an offloading of traffic from a cellular link on a cellular band to an unlicensed link on an unlicensed band, wherein the unlicensed link is synchronized with the cellular link (for example, on the basis of at least one of a subframe and symbol), said configuring being applicable for a cluster of paired terminals residing in a cell being controlled by the cellular base station, and sending (820) a configured parameter of traffic offloading to a terminal serving as a master of the cluster.

According to exemplary embodiments of the present invention, as described above, the configuring (810) may comprise at least one of configuring a number of symbol lengths to be used, by the master, as a sensing duration for sensing a channel on the unlicensed band, and configuring a predetermined delay time to be used, by the master, as delay time, after elapse of which since sensing of a channel on the unlicensed band, a dummy signal for occupying the sensed channel is transmitted, and configuring a parameter of channel sharing to be used, by the master for scheduling traffic resource blocks on the unlicensed band for the offloading traffic of the paired terminals of the cluster.

According to exemplary embodiments of the present invention, as described above, the method may further comprise receiving, from the master, a notification of proximity of another cluster of paired terminals, said notification including a delay time of occupancy of a sensed channel on the unlicensed band by the another cluster, recognizing the another cluster, and transmitting, to the master, an unlicensed band sharing notification including a parameter of channel sharing, said parameter of channel sharing to be used, by the master, when the sensed channel of the unlicensed band is usable for the initiated traffic offloading, for scheduling traffic resource blocks on the unlicensed band for the offloading traffic of the paired terminals of the cluster. Accordingly, according to exemplary embodiments of the present invention, a terminal serving as a master of an offloading cluster may perform the operations of detecting proximity of another cluster of paired terminals, sending a notification of proximity of the another cluster of paired terminals to the base station, said notification including a delay time of occupancy of a sensed channel on the unlicensed band by the another cluster, receiving, from the base station, an unlicensed band sharing notification including a parameter of channel sharing, and using said parameter of channel sharing to be used, when the sensed channel of the unlicensed band is usable for the initiated traffic offloading, for scheduling traffic resource blocks on the unlicensed band for the offloading traffic of the paired terminals of the cluster.

FIG. 9 shows a signaling diagram illustrating an exemplary procedure according to exemplary embodiments of the present invention, as described above.

As shown in FIG. 9, the thus illustrated exemplary embodiments of the present invention comprise an offloading configuration on the basis of a fixedly configured delay time (which may also be a configuration of a delay time to be specified randomly at the individual master terminals), corresponding offloading operations at the individual master terminals, a proximity detection (at least) at one of nearby offloading clusters (in the example of FIG. 9, master UE II), a proximity detection notification from the respective master terminal to the base station, a cluster recognition and band sharing mechanism decision operation at the base station, a band sharing notification operation including corresponding notifications to the involved master terminals, and corresponding offloading operations at the individual maser terminals on the basis of the thus notified band sharing mechanism or parameter.

As shown in FIG. 9, there are proposed respective messages and notifications to be exchanged between base station and master terminal(s). According to exemplary embodiments of the present invention, any one or all of the thus illustrated messages and notifications may be (newly defined) RRC signaling messages (e.g. applicable in the cellular LTE system) for unlicensed offloading. Such messages and notifications do not need to be denoted as illustrated in FIG. 9, but are specified in that they carry the above-defined information, such as e.g. number of sensing symbols, delay time properties (random, fixed and, if fixed, which length), channel occupancy state, band sharing parameter, and the like, between the defined source and destination endpoints, i.e. a controlling base station of offloading cluster(s) and master terminal(s) of offloading cluster(s).

According to exemplary embodiments of the present invention, as described above, in particular either one or both of the spectrum sensing technique and the interference avoidance technique, one or more of the following specific technical effects and advantaged can be achieved (in addition to those mentioned above).

Interference within an offloading cluster and mutual interference between multiple offloading clusters, in particular unpredictable interference on an unlicensed band, can be avoided or at least reduced. The synchronization of the cellular band can be beneficially utilized in unlicensed offloading. The proposed concepts, mechanisms, functions, operations, and the like can be integrated (as enhancements) in existing protocols, especially cellular protocols such as e.g. of the LTE standard. The terminals do not need to support any additional RRC MAC and PHY functions of the unlicensed band but only those of the cellular band.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including software, hardware or both.

Respective exemplary embodiments of the present invention are described below referring to FIG. 10, while for the sake of brevity reference is made to the detailed description of respective corresponding methods and operations according to FIGS. 2 to 9 as well as the underlying network scenario according to FIG. 1.

Figure 10:
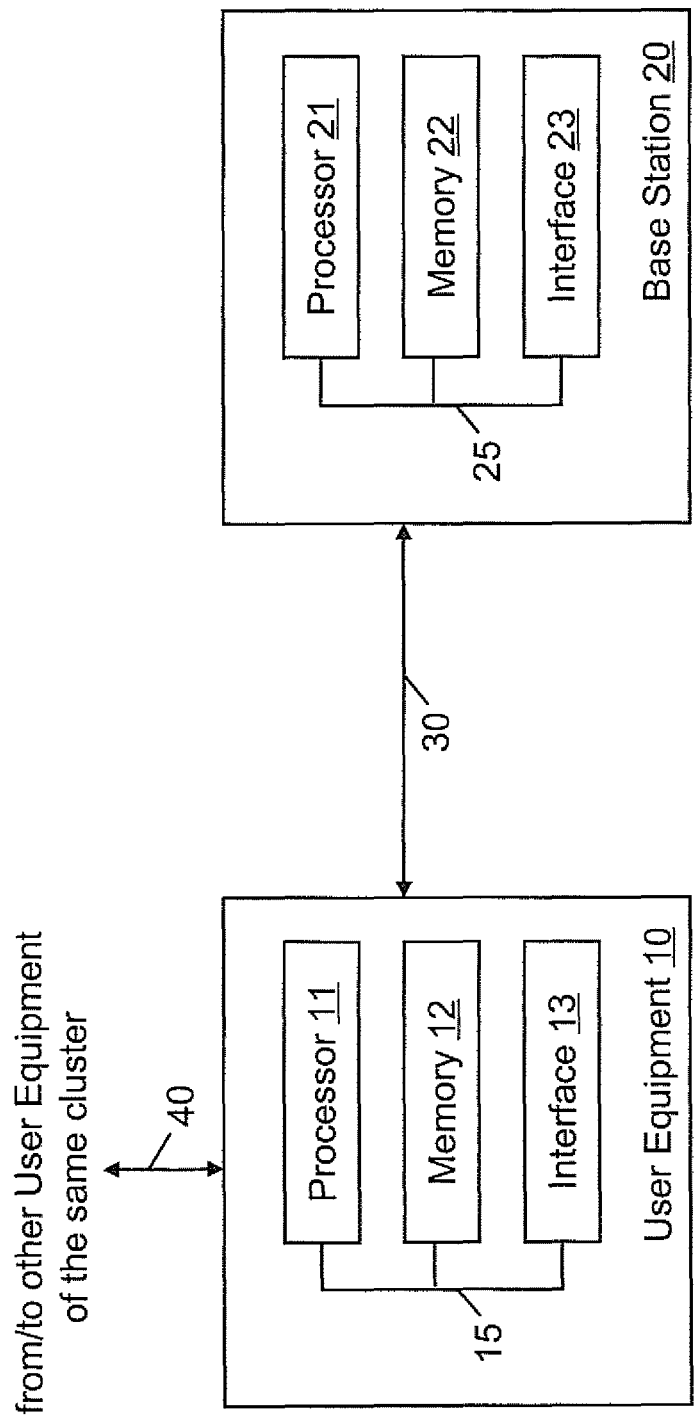
FIG. 10 shows a block diagram illustrating exemplary devices according to exemplary embodiments of the present invention.

In FIG. 10 below, which is noted to represent a simplified block diagram, the solid line blocks are basically configured to perform respective operations as described above. The entirety of solid line blocks are basically configured to perform the methods and operations as described above, respectively. With respect to FIG. 10, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and the direction in which certain data is transferred.

Further, in FIG. 10, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 10 shows a block diagram illustrating exemplary devices according to exemplary embodiments of the present invention. As mentioned above, it is noted that the illustration of (electronic) devices (apparatuses) according to FIG. 10 is simplified.

In view of the above, the thus described devices (apparatuses) 10 and 20 are suitable for use in practicing the exemplary embodiments of the present invention, as described herein. The thus described apparatus 10 on the left hand side may represent a (part of a) terminal or user equipment UE, as described above, and may be configured to perform a procedure and exhibit a functionality as described in conjunction with any one of FIGS. 2 to 7 and 9. The thus described apparatus 20 on the right hand side may represent a (part of a) base station or access node, such as for example a eNB, as described above, and may be configured to perform a procedure and exhibit a functionality as described in conjunction with any one of FIGS. 8 and 9.

As shown in FIG. 10, according to exemplary embodiments of the present invention, a terminal or user equipment 10 comprises a processor 11, a memory 12, and an interface 13, which are connected by a bus 15 or the like, and a base station 20 comprises a processor 21, a memory 22, and an interface 23, which are connected by a bus 25 or the like. The terminal or user equipment 10 may be connected with the base station 20 through a link or connection 30, and terminal or user equipment 10 may be connected with a (another) terminal or user equipment through a link or connection 40. In view thereof, the illustrated terminal or user equipment 10 may serve as a master terminal of an offloading cluster, which is connected to its slave terminals via the connection or link 40, or as a slave terminal of an offloading cluster, which is connected to its master terminal via the connection or link 40.

The memories 12 and 22 may store respective programs assumed to include program instructions that, when executed by the associated processors 11 and 21, enable the respective electronic device or apparatus to operate in accordance with the exemplary embodiments of the present invention. The processors 11 and 21 may also include a modem or the like to facilitate communication over the (hardwire or wireless) links 30 and 40 via the interfaces 13 and 23, respectively. The interfaces 13 and 23 may further include a suitable transceiver coupled to one or more antennas or communication means for (hardwire or wireless) communications with the linked or connected device(s), respectively. The interfaces 13 and 23 are generally configured to communicate with another apparatus, i.e. the interface thereof.

In general terms, the respective devices (apparatuses) (or parts thereof) may represent means for performing respective operations and exhibiting respective functionalities, and/or the respective devices (or parts thereof) may have functions for performing respective operations and exhibiting respective functionalities.

According to exemplary embodiments of the present invention, the interface 13 is configured for communication on a cellular band and an unlicensed band, and the processor 11 is configured to initiate an offloading of traffic from a cellular link on a cellular band to an unlicensed link on an unlicensed ban, and to sense a channel on the unlicensed band in a symbol-synchronized sensing duration of at least one symbol length at the beginning of a predetermined subframe of the unlicensed band.

According to exemplary embodiments of the present invention, the processor 11 may be configured to sense at least one of an occupancy state and an interference level of the channel in the sensing duration on the unlicensed band, and determine that the channel on the unlicensed band is usable for the initiated traffic offloading on the basis of the at least one of the sensed occupancy state and the sensed interference level of the channel, namely when the occupancy state is sensed to be idle, or the interference level is sensed to be below a predetermined threshold level, or the occupancy state is sensed to be idle and the interference level is sensed to be below a predetermined threshold level.

According to exemplary embodiments of the present invention, the processor 11 to perform the sensing in a beacon subframe of the unlicensed band, as well as, when the channel of the unlicensed band is usable for the initiated traffic offloading, to schedule traffic resource blocks on the unlicensed band for the offloading traffic of the paired terminals of the cluster, and to transfer, via the interface 13, the scheduled traffic resource blocks to the paired terminals of the cluster on the unlicensed band. Also, the processor 11 may be configured to detect proximity of another cluster of paired terminals, and to inform, via the interface 13, the cellular base station of a delay time of occupancy of the sensed channel by the another cluster. Further, the processor 11 may be configured to receive, via the interface 13, an unlicensed band sharing notification including a parameter of channel sharing from the cellular base station, and, when the channel of the unlicensed band is usable for the initiated traffic offloading, to schedule traffic resource blocks on the unlicensed band for the offloading traffic of the paired terminals of the cluster on the basis of the received parameter of channel sharing, and to transfer, via the interface, the scheduled traffic resource blocks to the paired terminals of the cluster on the unlicensed band. Still further, the processor 11 may be configured to, when the channel of the unlicensed band is usable for the initiated traffic offloading, transmit, via the interface 13, a dummy signal for occupying the sensed channel within the predetermined subframe after elapse of a predetermined delay time since the sensing of the channel is completed, wherein the predetermined delay time is random or fixedly preconfigured by the cellular base station.

According to exemplary embodiments of the present invention, the processor 11 to perform the sensing in a scheduled transmission subframe on a scheduled transmission bandwidth, as well as, when the channel of the unlicensed band is usable for the initiated traffic offloading, to perform, via the interface 13, transmission of the offloading traffic on the channel of the unlicensed band, or, when the channel of the unlicensed band is not usable for the initiated traffic offloading, to discard transmission of the offloading traffic on the channel of the unlicensed band.

According to exemplarily embodiments of the present invention, the processor 11, the memory 12 and the interface 13 can be implemented as individual modules, chipsets or the like, or one or more of them can be implemented as a common module, chipset or the like.

According to exemplary embodiments of the present invention, the interface 23 is configured for communication on a cellular band, and the processor 13 is configured to configure an offloading of traffic from a cellular link on the cellular band to an unlicensed link on an unlicensed band, said configuring being applicable for a cluster of paired terminals residing in a cell being controlled by a cellular base station, and to send, via the interface 23, a configured parameter of traffic offloading to a terminal serving as a master of the cluster.

According to exemplary embodiments of the present invention, the processor 21 may be configured to configure at least one of a number of symbol lengths and a predetermined delay time to be use by a master terminal of an offloading cluster controlled by the base station 20. Also, the processor 21 may be configured to receive, via the interface 23, from the master, a notification of proximity of another cluster of paired terminals, said notification including a delay time of occupancy of a sensed channel on the unlicensed band by the another cluster, to recognize the another cluster, and to transmit, via the interface 23, to the master, an unlicensed band sharing notification including a parameter of channel sharing.

According to exemplarily embodiments of the present invention, the processor 21, the memory 22 and the interface 23 can be implemented as individual modules, chipsets or the like, or one or more of them can be implemented as a common module, chipset or the like.

According to exemplarily embodiments of the present invention, a system may comprise any conceivable combination of the thus depicted devices (apparatuses) and other network elements, which are configured to cooperate as described above.

In general, it is to be noted that respective functional blocks or elements according to above-described aspects can be implemented by any known means, either in hardware or software or both, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device (apparatus) may be represented by a semiconductor chip, a chipset, or a (hardware) module comprising such chip or chipset; this, however, does not exclude the possibility that a functionality of a device (apparatus) or module, instead of being hardware implemented, be implemented as software in a (software) module such as a computer program or a computer program product comprising executable software code portions for execution or being run on a processor. A device may be regarded as a device (apparatus) or as an assembly of more than one device (apparatus), whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means (portions) or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, the present invention and exemplary embodiments thereof provide measures for spectrum sharing for cellular-controlled offloading using an unlicensed band. Such measures exemplarily comprise initiating an offloading of traffic from a cellular link on a cellular band to an unlicensed link on an unlicensed band, wherein the unlicensed link is synchronized with the cellular link, and sensing a channel on the unlicensed band in a symbol-synchronized sensing duration of at least one symbol length at the beginning of a predetermined subframe of the unlicensed band.

Even though the present invention and exemplary embodiments are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS, ABBREVIATIONS AND DEFINITIONS

3GPP $3^{rd}$ Generation Partnership Project
eNB evolved NodeB
GPRS General Packet Radio Service
GSM Global System for Mobile Communication
IEEE Institute of Electrical and Electronics Engineers
IMT-A International Mobile Telecommunications—Advanced
ISM band Industrial, Scientific and Medical band
LTE Long Term Evolution
MAC Media Access Control
PDCCH Physical Downlink Control Channel
PHY Physical layer
RRC Radio Resource Control
UMTS Universal Mobile Telecommunication Service
WLAN Wireless Local Area Network

What is claimed is:

1. A method comprising
    initiating an offloading of traffic from a cellular link on a cellular band to an unlicensed link on an unlicensed band, wherein the unlicensed link is synchronized with the cellular link, and
    sensing a channel on the unlicensed band in a symbol-synchronized sensing duration of at least one symbol length at the beginning of a predetermined sub frame of the unlicensed band.

2. The method according to claim 1, wherein the sensing comprises
    sensing at least one of an occupancy state and an interference level of the channel in the sensing duration on the unlicensed band, and
    determining that the channel on the unlicensed band is usable for the initiated traffic offloading on the basis of the at least one of the sensed occupancy state and the sensed interference level of the channel.

3. The method according to claim 1, wherein
    the method is operable at or by a terminal serving as a master of a cluster of paired terminals residing in a cell being controlled by a cellular base station,
    the predetermined subframe of the unlicensed band is a beacon sub frame, and
    the method comprises, when the channel of the unlicensed band is usable for the initiated traffic offloading, scheduling traffic resource blocks on the unlicensed band for the offloading traffic of the paired terminals of the cluster, and transferring the scheduled traffic resource blocks to the paired terminals of the cluster on the unlicensed band.

4. The method according to claim 1, wherein
the method is operable at or by a terminal serving as a master of a cluster of paired terminals residing in a cell being controlled by a cellular base station, and
the method comprises at least one of
  detecting proximity of another cluster of paired terminals, and informing the cellular base station of a delay time of occupancy of the sensed channel by the another cluster, and
  receiving an unlicensed band sharing notification including a parameter of channel sharing from the cellular base station, and, when the channel of the unlicensed band is usable for the initiated traffic offloading, scheduling traffic resource blocks on the unlicensed band for the offloading traffic of the paired terminals of the cluster on the basis of the received parameter of channel sharing, and transferring the scheduled traffic resource blocks to the paired terminals of the cluster on the unlicensed band.

5. The method according claim 1, wherein
the method is operable at or by a terminal serving as a master of a cluster of paired terminals residing in a cell being controlled by a cellular base station, and
the sensing comprises, when the channel of the unlicensed band is usable for the initiated traffic offloading, transmitting a dummy signal for occupying the sensed channel within the predetermined subframe after elapse of a predetermined delay time since the sensing of the channel is completed, wherein the predetermined delay time is random or fixedly preconfigured by the cellular base station.

6. The method according to claim 1, wherein
the method is operable at or by a terminal serving as a slave of a cluster of paired terminals residing in a cell being controlled by a cellular base station,
the predetermined sub frame of the unlicensed band is a scheduled traffic resource block including a scheduled transmission subframe on a scheduled transmission bandwidth of the terminal, wherein the scheduled transmission sub frame and the scheduled transmission bandwidth of the terminal are received as a scheduled transmission resource block a master of the cluster, and
the method comprises, when the channel of the unlicensed band is usable for the initiated traffic offloading, performing transmission of the offloading traffic on the channel of the unlicensed band, or, when the channel of the unlicensed band is not usable for the initiated traffic offloading, discarding transmission of the offloading traffic on the channel of the unlicensed band.

7. A method comprising
configuring, at or by a cellular base station, an offloading of traffic from a cellular link on a cellular band to an unlicensed link on an unlicensed band, wherein the unlicensed link is synchronized with the cellular link, said configuring being applicable for a cluster of paired terminals residing in a cell being controlled by the cellular base station,
sending a configured parameter of traffic offloading to a terminal serving as a master of the cluster, and
configuring a sensing duration to be used by the master for sensing a channel on the unlicensed band in a symbol-synchronized sensing duration at the beginning of a predetermined sub frame of the unlicensed band.

8. The method according to claim 7, wherein the configuring comprises
configuring a predetermined delay time to be used, by the master, as delay time, after elapse of which since sensing of a channel on the unlicensed band in a symbol-synchronized sensing duration at the beginning of a predetermined sub frame of the unlicensed band is completed, a dummy signal for occupying the sensed channel is transmitted within a predetermined sub frame of the unlicensed band, when the channel of the unlicensed band is usable for the initiated traffic offloading.

9. The method according to claim 8, wherein at least one of the following applies:
the cellular band is a frequency band of a wide-area cellular communication standard, and
the unlicensed band is a frequency band of a local-area communication standard.

10. The method according to claim 7, further comprising
receiving, from the master, a notification of proximity of another cluster of paired terminals, said notification including a delay time of occupancy of a sensed channel on the unlicensed band by the another cluster,
recognizing the another cluster, and
transmitting, to the master, an unlicensed band sharing notification including a parameter of channel sharing, said parameter of channel sharing to be used, by the master, when the sensed channel of the unlicensed band is usable for the initiated traffic offloading, for scheduling traffic resource blocks on the unlicensed band for the offloading traffic of the paired terminals of the cluster.

11. An apparatus comprising
an interface configured for communication on a cellular band and an unlicensed band, and
circuitry configured to:
  initiate an offloading of traffic from a cellular link on a cellular band to an unlicensed link on an unlicensed band, wherein the unlicensed link is synchronized with the cellular link, and
  sense a channel on the unlicensed band in a symbol-synchronized sensing duration of at least one symbol length at the beginning of a predetermined sub frame of the unlicensed band.

12. The apparatus according to claim 11, wherein the circuitry is configured to
sense at least one of an occupancy state and an interference level of the channel in the sensing duration on the unlicensed band, and
determine that the channel on the unlicensed band is usable for the initiated traffic offloading on the basis of the at least one of the sensed occupancy state and the sensed interference level of the channel.

13. The apparatus according to claim 11, wherein
the apparatus is operable as or at a terminal serving as a master of a cluster of paired terminals residing in a cell being controlled by a cellular base station,
the predetermined subframe of the unlicensed band is a beacon sub frame, and
the circuitry is configured to, when the channel of the unlicensed band is usable for the initiated traffic offloading, schedule transmission traffic resource blocks on the unlicensed band for the offloading traffic of the paired terminals of the cluster, and to transfer, via the interface, the scheduled traffic resource blocks to the paired terminals of the cluster on the unlicensed band.

14. The apparatus according to claim 11, wherein
the apparatus is operable as or at a terminal serving as a master of a cluster of paired terminals residing in a cell being controlled by a cellular base station, and
at least one of the following applies:
the circuitry is configured to detect proximity of another cluster of paired terminals, and to inform, via the interface, the cellular base station of a delay time of occupancy of the sensed channel by the another cluster, and
the circuitry is configured to receive, via the interface, an unlicensed band sharing notification including a parameter of channel sharing from the cellular base station, and, when the channel of the unlicensed band is usable for the initiated traffic offloading, to schedule traffic resource blocks on the unlicensed band for the offloading traffic of the paired terminals of the cluster on the basis of the received parameter of channel sharing, and to transfer, via the interface, the scheduled traffic resource blocks to the paired terminals of the cluster on the unlicensed band.

15. The apparatus according to claim 11, wherein
the apparatus is operable as or at a terminal serving as a master of a cluster of paired terminals residing in a cell being controlled by a cellular base station, and
the circuitry is configured for sensing the channel, when the channel of the unlicensed band is usable for the initiated traffic offloading, transmit, via the interface, a dummy signal for occupying the sensed channel within the predetermined sub frame after elapse of a predetermined delay time since the sensing of the channel is completed, wherein the predetermined delay time is random or fixedly preconfigured by the cellular base station.

16. The apparatus according to claim 11, wherein
the apparatus is operable as or at a terminal serving as a slave of a cluster of paired terminals residing in a cell being controlled by a cellular base station,
the predetermined sub frame of the unlicensed band is a scheduled transmission sub frame on a scheduled transmission bandwidth of the terminal, wherein the scheduled transmission subframe and the scheduled transmission bandwidth of the terminal are received as a scheduled transmission resource block a master of the cluster, and
the circuitry is configured to, when the channel of the unlicensed band is usable for the initiated traffic offloading, perform, via the interface, transmission of the offloading traffic on the channel of the unlicensed band, or, when the channel of the unlicensed band is not usable for the initiated traffic offloading, discard transmission of the offloading traffic on the channel of the unlicensed band.

17. The apparatus according to claim 11, wherein at least one of the following applies:
the cellular band is a frequency band of a wide-area cellular communication standard, and
the unlicensed band is a frequency band of a local-area communication standard.

18. An apparatus comprising
an interface configured for communication on a cellular band, and
circuitry configured to:
configure an offloading of traffic from a cellular link on the cellular band to an unlicensed link on an unlicensed band, wherein the unlicensed link is synchronized with the cellular link, said configuring being applicable for a cluster of paired terminals residing in a cell being controlled by a cellular base station,
send, via the interface, a configured parameter of traffic offloading to a terminal serving as a master of the cluster, and
configure a sensing duration to be used by the master for sensing a channel on the unlicensed band in a symbol-synchronized sensing duration at the beginning of a predetermined sub frame of the unlicensed band,
wherein the apparatus is operable as or at the cellular base station.

19. The apparatus according to claim 18, wherein the circuitry is configured to:
configure a predetermined delay time to be used, by the master, as delay time, after elapse of which since sensing of a channel on the unlicensed band in a symbol-synchronized sensing duration at the beginning of a predetermined sub frame of the unlicensed band is completed, a dummy signal for occupying the sensed channel is transmitted within a predetermined sub frame of the unlicensed band, when the channel of the unlicensed band is usable for the initiated traffic offloading.

20. The apparatus according to claim 18, wherein the circuitry is configured to:
receive, via the interface, from the master, a notification of proximity of another cluster of paired terminals, said notification including a delay time of occupancy of a sensed channel on the unlicensed band by the another cluster,
recognize the another cluster, and
transmit, via the interface, to the master, an unlicensed band sharing notification including a parameter of channel sharing, said parameter of channel sharing to be used, by the master, when the sensed channel of the unlicensed band is usable for the initiated traffic offloading, for scheduling traffic resource blocks on the unlicensed band for the offloading traffic of the paired terminals of the cluster.

* * * * *